Aug. 15, 1939.   H. I. ROMNES   2,169,851
TRANSMISSION LEVEL TRANSIENT CHANGE INDICATOR
Filed July 9, 1937
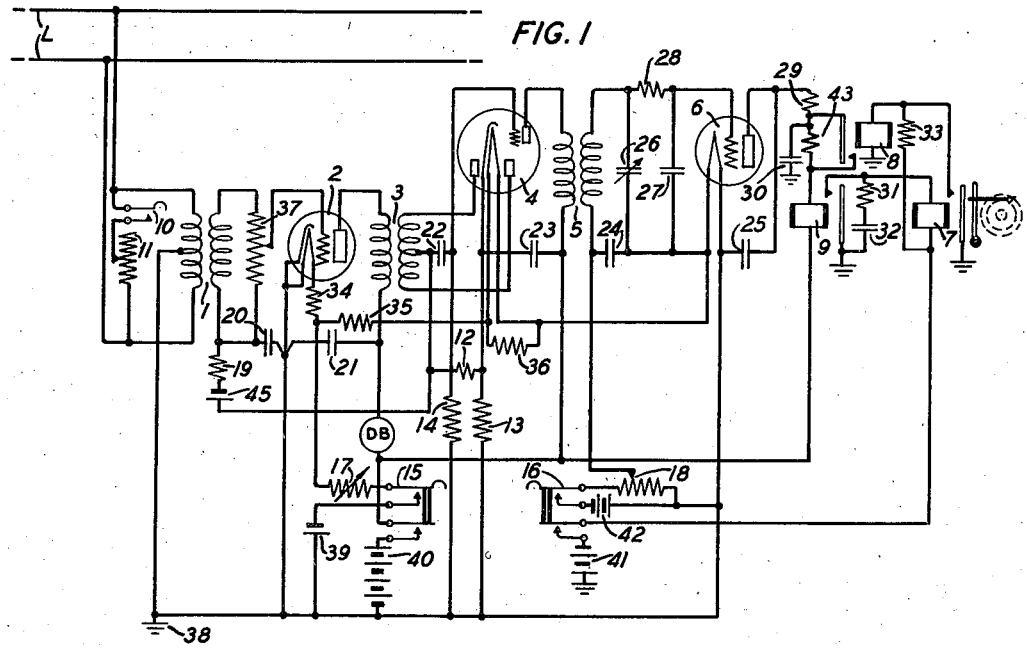
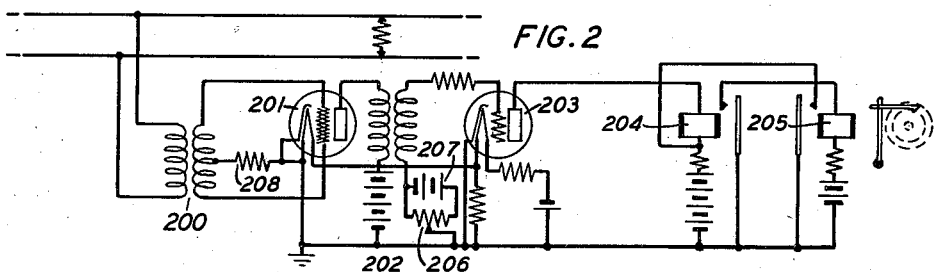
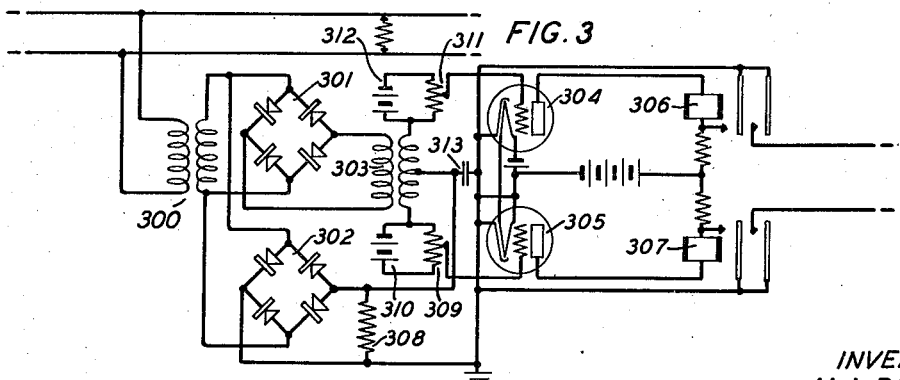
INVENTOR
*H. I. ROMNES*
BY *J. W. Schmied*
ATTORNEY Patented Aug. 15, 1939

2,169,851

UNITED STATES PATENT OFFICE 2,169,851

TRANSMISSION LEVEL TRANSIENT CHANGE INDICATOR

Haakon I. Romnes, Chatham, N. J., assignor to Bell Telephone Laboratories, Incorporated, New York, N. Y., a corporation of New York Application July 9, 1937, Serial No. 152,734

6 Claims. (Cl. 178—69)

This invention relates to transmission systems and more particularly to an arrangement for indicating sudden variations of small duration in the transmission level of such systems. By the "transmission level" at any point in a system is meant the logarithm of the ratio of the power being transmitted past the point to that power which is arbitrarily chosen to correspond to the "zero" or "reference" level.

An object of this invention is to provide means for indicating transient variations in the net loss of transmission systems, such as those used in transmitting telegraph and teletypewriter signals. The "transmission loss" at any frequency caused by any modification in a communication system or part thereof is the logarithm of the ratio of the power delivered to any part of the system beyond the point of modification before and after the modification.

False operation of teletypewriter receivers due to transients is an important source of trouble in the operation of teletypewriter systems. The net loss of a long toll line may gradually change, due to the effect of power voltage changes, temperature changes, and other factors, over a relatively wide range without causing trouble in telegraph systems. Sudden variations, called "hits", of several decibels in magnitude, lasting only a few thousandths of a second, resulting from the operation of relays in sequence rather than simultaneously or from inductive surges due to relays operating or releasing, may, however, result in false operation even though their magnitude is within the range over which the level may safely change gradually.

There are a number of devices of different varieties available for measuring changes in the net loss of transmission lines, none of which, however, combine the function of indicating bothersome transient fluctuations of relatively small order without indicating a permissible, wider, slow change.

A feature of this invention comprises an indicating device embodying a rectifier, a gas-filled tube and a measuring or recording device.

Another feature comprises means for controlling the sensitivity of the gas-filled tube as the transmission level of the line gradually varies.

Still another feature comprises the use of a plurality of rectifiers in a hit indicator, the output of one of which causes the tube to ionize and be conductive on a sudden variation in the transmission level and the other of which maintains the gas-filled tube sensitive to such sudden variations even though the transmission level varies greatly between wide limits.

Other and further features will be apparent from the general and detailed description which follow hereinafter.

Fig. 1 shows the preferred embodiment of the invention. Figs. 2 and 3 show modifications of the arrangement of Fig. 1.

Keys 15 and 16 in Fig. 1 are operated to close their make contacts. Operation of key 15 furnishes filament battery to tube 2 over a circuit from the negative terminal of filament battery 39, through the upper front contact and armature of key 15, resistance 17, resistance 34, filament of tube 2, back to the positive terminal of filament battery 39. Filament of tube 2 is heated. Filament battery is also furnished to tubes 4 and 6 through the same key contact over a circuit from the negative terminal of battery 39, upper front contact and armature key 15, resistance 17, resistance 35, filament tube 4 in parallel with resistance 36, filament tube 6, back to the positive terminal of battery 39. Filaments of tubes 4 and 6 are heated. Operation of key 15 also supplies potential to the anodes of the three tubes. In the case of tube 2 the circuit may be traced from ground 38, through battery 40, lower front contact and armature key 15, meter DB, primary transformer 3, to the anode of tube 2. For tube 4 the path may be traced from ground 38, through plate battery 40, lower front contact and armature key 15, primary transformer 5, to the anode of tube 4. For tube 6 potential is furnished over a circuit from ground 38, battery 40, front contact and armature key 15, winding of relay 9, resistance 29, to the anode of tube 6.

Operation of key 16 closes battery 42 across potentiometer 18 at the key upper front contact and armature and extends a circuit from ground 38, through the two-branch parallel circuit comprising battery 42, upper front contact and armature of key 16, and left-hand portion of potentiometer 18 as the first branch, and the right-hand portion of potentiometer 18 as the second branch, through the potentiometer sliding contact, through the secondary of transformer 5, resistance 28, to the grid of tube 6. Potentiometer 18 therefore provides a means of applying a varying grid potential bias on gas-filled tube 6 and is one of the means of regulating the intensity of the "hit" to which the circuit is responsive.

Operation of key 16 also furnishes signal battery 41 through its lower front contact and armature, resistance 33, winding of relay 8, to ground, operating relay 8. The operation of relay 8 shunts resistance 43 in the output circuit of tube 6, used to deionize the gas tube as will be hereinafter explained.

The indicator in one of its applications is bridged across a circuit L, in which steady tone is being transmitted. The tone is impressed through transformer 1, on the input of amplifier tube 2. The primary function of this tube is to permit the use of the indicator down to fairly low input level, approximately —20 decibels (0=1 milliwatt).

The output of amplifier tube 2 is impressed, through transformer 3, on the diode portion of tube 4 which acts as a full wave rectifier. This results in a pulsating rectified current flowing in resistance 12. The voltage developed across resistance 12 is applied through condenser 22 to the grid of the triode portion of tube 4.

The voltage impressed between the anode of tube 4 and ground, for which the path was heretofore traced, operates across the space to the cathode of tube 4, thence through resistance 13 to ground. Tube 4 anode current flowing in this path maintains the cathode at about 6 volts above ground with no input voltage on tube 4 grid, due to the drop in resistance 13. Tube 4 grid is at ground potential from ground 38 through resistance 14. It is therefore 6 volts negative with respect to the cathode. Condenser 22 is a blocking condenser.

The triode portion of the tube acts as an amplifier and applies a pulsating unidirectional voltage to the primary of transformer 5. As long as the input from line L remains constant, or varies slowly, the secondary of transformer 5 will have only a small pulsating voltage across it. However, a sudden disturbance, or "hit", will result in a sudden change in the current flowing through the primary and therefore a sudden surge across the secondary of transformer 5. This voltage surge in turn will be impressed upon the input of the gas-filled, or so-called "trigger", tube 6. It is characteristic of this tube that it is responsive only when the grid voltage reaches a certain critical value. It then ionizes. The bias placed on tube 6 grid as heretofore described operates as a control on the intensity of the surge to which the gas-filled tube is responsive. When there is a sudden disturbance or "hit" in circuit L it will result in a voltage peak in the secondary of transformer 5 which, if it is great enough, will overcome the bias on the grid of tube 6 and the tube will ionize, operating relay 9 in the tube output circuit. The operation of relay 9 closes a circuit to ground for the operation of message register 7 from battery 41 through the lower front contact and armature of key 16, message register 7 winding, front contact and armature of relay 9 to ground. The message register counts the hits registered. By adaptation the register could be made to function to mark a time chart to indicate also the time of each hit. While a message register is shown as used for the indicating purpose in Fig. 1 the circuit is readily adaptable to function with any of a wide variety of indicating or measuring devices.

Operation of message register 7 shunts the winding of relay 8, which was operated upon the operation of key 16, to ground through message register 7, front contact and armature. Relay 8 is released, removing the shunt around resistance 43. This resistance is of relatively high value, approximately .5 megohm. The insertion of this resistance in the plate circuit together with condenser 30 deionizes the tube and prevents it from ionizing again when the plate circuit of the tube is restored to normal.

Resistance 31 and condenser 32 absorb the inductive surge resulting from the release of the message register and thus prevent the induction of stray voltages into other parts of the "hit" indicator. Resistance 29 limits the plate current of tube 6. Condensers 25 and 27 act to absorb very short disturbances in the plate and grid circuits respectively and so prevent false indications due to induced charges from neighboring circuits. Resistance 28 limits the current drawn by the grid when tube 6 is ionized. Variable condenser 26 is adjustable to prevent the "hit" indicator from responding to hits of such short duration as would cause no trouble. Condensers 20, 21, 23 and 24 are by-pass condensers to provide low impedance paths for the higher frequency currents.

The level of the test tone on the circuit being measured may slowly drift over a range of several decibels. The "hit" indicator will be approximately equally responsive in terms of decibels in any part of the drift range. With normal voltage applied to the grid of tube 2 the voltage across resistance 12 is about 10 volts. Battery 45 is three volts. Therefore, at this level the grid of tube 2 is about minus 13 volts with respect to the cathode of tube 4 or about minus 7 volts with respect to ground and cathode of tube 2. When the level input to the "hit" indicator drifts higher, the drop through resistance 12 increases and the negative bias on tube 2 increases, reducing the gain of tube 2 and, therefore, partially compensating for the increase in the incoming level. The reverse occurs when the level decreases. With this arrangement it is possible to get approximately uniform sensitivity over a range of about five decibels above or below a normal level.

Twenty-four volts is used for filament battery. One hundred and thirty volts is used for anode or plate battery. Twenty-four volts is used for signal battery.

The filaments of tubes 2 and 4 use .32 ampere at 10 volts. The filament of tube 6 uses .35 ampere at 1¾ volts. Resistance 36 is used to pass the .03 ampere difference between that required for tube 6 and tube 4. Resistances 34 and 35 are inserted to make the drop from the junction of these two resistances through each filament circuit to ground equal to 19 volts with normal current flowing. Resistance 17 is variable and is used in making adjustments for changes in the normal office battery voltage.

Key 15 is arranged to apply filament battery 39 before battery 40 is applied to the anode of gas tube 6 in order to protect the tube.

In the second embodiment of this invention, shown in Fig. 2, the test input is impressed on the grids of the coplanar grid detector tube 201 through transformer 200. As long as the input is constant or varies slowly the secondary of transformer 202 will have only a small alternating current voltage across it, due to imperfect rectification of tube 201. However, if there is a sudden variation or "hit" in the input, it will result in a voltage peak across the secondary of transformer 202, which will be impressed on the input of tube 203. This peak will break down gas-filled tube 203 to cause a flow of current in the output circuit, operating relay 204. The operation of relay 204 closes an obvious circuit for the operation of message register 205 which counts the "hit". The operation of message register 205 also shunts relay 204 at relay 205 make contact, releasing relay 204 and deionizing tube 203.

Potentiometer 206 and grid battery 207 provide means for varying the bias of tube 203 so as to regulate the intensity of the "hit" to which the circuit is responsive.

A rectified pulsating current flows in resistance 208. The voltage across resistance 208 is impressed on the grid of tube 201. This voltage which will vary with the input, being higher for high level input, is used to bias tube 201. It therefore tends to compensate for gradual input level changes due to drift through the operating range of the circuit, thus making the circuit approximately equally responsive to "hits" of the same magnitude while the input level slowly drifts over the operating range.

In the third embodiment of this invention, shown in Fig. 3, the test input is impressed, through transformer 300, on the copper-oxide rectifiers 301 and 302.

The output of rectifier 301 is impressed through transformer 303 on the input circuits of gas-filled tubes 304 and 305.

The output voltage of rectifier 302 is impressed through the delay circuit, comprising resistance 308 and condenser 313, on the grids of gas-filled tubes 304 and 305. In the case of tube 304 the voltage is impressed through the upper half of the secondary of transformer 303, potentiometer 311 and battery 312 in parallel to tube 304 grid. For tube 305 the voltage is impressed through the lower half of the secondary of transformer 303, potentiometer 309 and battery 310 in parallel, to tube 305 grid.

While the input level varies gradually, the grid bias on gas tubes 304 and 305 will likewise vary, tending to make the circuit equally sensitive throughout the operating range. A sudden "hit" or change in input level, however, will cause a surge or peak across the secondary of transformer 303, ionizing gas-filled tube 304 or 305, depending upon whether the "hit" is positive or negative, before the grid bias change on the tube is effected due to the delay circuit. Gas tube 304 or 305 will ionize. Relay 306 or 307 in the output of the operated tube will be energized operating an indicating device, not shown, to record the "hit".

What is claimed is:

1. In combination with a transmission circuit, means for indicating sudden variations of short duration in the transmission level of said circuit, said means comprising rectifying means operatively connected to the said transmission circuit, a gas-filled tube supplied with controlling voltage directly from the output of said rectifier, an indicating device controlled by said gas-filled tube, means for regulating the sensitivity of said tube to prevent its operation as said level changes gradually in accordance with the transmission level changes of said circuit, and means for delaying such sensitivity regulation upon a sudden change in the transmission level until said tube has operated to cause the indicating device to evidence the sudden variation.

2. A device for indicating sudden variations of short duration in the transmission level of a transmission circuit, comprising rectifying means to be bridged across said circuit, a gas-filled tube including a grid, said tube being connected in the output circuit of said means, a second rectifying means bridged across the transmission circuit, said second means comprising a grid biasing potential for said output varying with the gradual variations in the transmission level of the circuit, and means for delaying the action of said second rectifier means upon the sudden variation in the transmission level until after the tube becomes conductive.

3. An indicating device for recording sudden changes above a minimum specific intensity in level of a transmission circuit, said indicating device being unresponsive to gradual level changes in the transmission circuit, said device comprising a rectifier coupled to said transmission circuit, a gas-filled tube including a grid coupled to the rectifier output and a recording device connected to the output of said tube, means in the input circuit to said tube for varying the bias on the tube grid as the level changes gradually to prevent ionization of the tube and means in the input circuit to said tube comprising a transformer and a delay circuit for ionizing the tube upon sudden variations in the level of the transmission circuit.

4. In combination with a transmission circuit in which the energy level slowly varies over a wide range and is subject to sudden small disturbing variations, means for recording the disturbing variations comprising a first rectifier bridged across said circuit, a plurality of gas tubes, each tube including a grid, a recording device connected to the output of said tubes, means comprising a transformer for impressing the output of said rectifier on the input of the gas tubes, a second rectifier bridged across said circuit, connecting means for impressing a voltage from the output of said second rectifier on said grids as a biasing potential to prevent the operation of said tubes as the energy level in said circuit slowly changes, and means including a delay network in the connecting means to retard the biasing potential change due to said sudden variations until after the tubes have functioned to operate the recorder.

5. In combination with a transmission circuit in which the transmission level slowly varies over a wide range and is subject to sudden small disturbing variations, a device for recording the disturbing variations comprising a detector tube having coplanar grids bridged through a transformer across said transmission circuit and an output circuit connected through a second transformer to the input of a gas-filled tube having a recorder connected to its output, means in said device for impressing a small alternating voltage on said second transformer while said level remains unchanged and while it varies slowly and means also in said device for impressing a voltage peak through said second transformer on the input of said gas-filled tube to ionize said tube and operates said recorder when said level changes suddenly.

6. A device for indicating only sudden fluctuations in the transmission level of a circuit wherein said level may vary gradually within wide limits, comprising an amplifier bridged across said circuit, a grid in said amplifier, thermionic means comprising a rectifier connected to the output of said amplifier and a gas-filled tube connected to the output of said thermionic means, means connected to the output of said rectifier for varying the bias on said grid to compensate for said wide gradual variations in said level and means comprising a transformer in the input of said gas-filled tube for ionizing said tube when said level changes suddenly.

HAAKON I. ROMNES.